United States Patent

Carson et al.

[15] 3,702,561
[45] Nov. 14, 1972

[54] SYSTEM FOR CHECKING THE PERFORMANCE OF A DYNAMOELECTRIC MACHINE OVERHEATING DETECTOR

[72] Inventors: Chester C. Carson, Ballston Spa; Federico S. Echeverria, Schenectady; Sterling C. Barton, Scotia, all of N.Y.

[73] Assignee: General Electric Company

[22] Filed: Aug. 31, 1971

[21] Appl. No.: 176,552

[52] U.S. Cl. .................................................73/1 F
[51] Int. Cl. .............................................G01k 15/00
[58] Field of Search ..............73/1 R, 28, 1 F, 339 R; 310/52, 55; 250/222 PC, 218; 340/237, 410

[56] References Cited

UNITED STATES PATENTS

| 3,427,880 | 2/1969 | Grobel | 73/339 R |
| 2,828,432 | 3/1958 | Rich | 73/28 |
| 3,518,439 | 6/1970 | Fuhrmann | 250/218 |

Primary Examiner—Louis R. Prince
Assistant Examiner—Denis E. Corr
Attorney—William C. Crutcher et al.

[57] ABSTRACT

In a system for detecting overheating in a generator by sensing the presence of sub-micron decomposition particles present in the generator cooling gas, a test device is included in the detector flow path for selectively introducing sub-micron particles to check the performance of the detector and the effectiveness of the filter. The test device includes a filament coated with polymeric material and a timed switch for passing a current through the filament to heat it.

3 Claims, 2 Drawing Figures

PATENTED NOV 14 1972 3,702,561
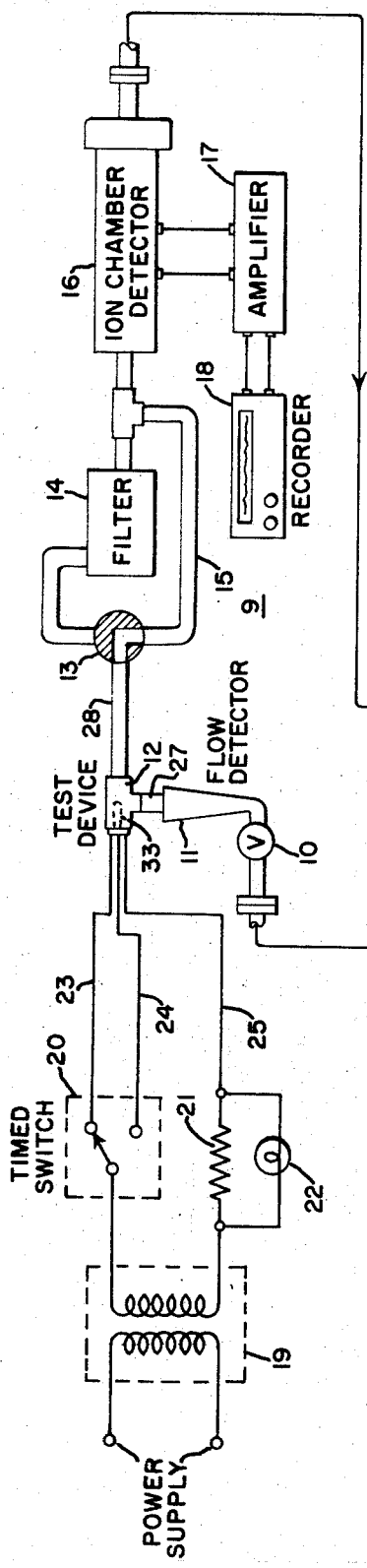
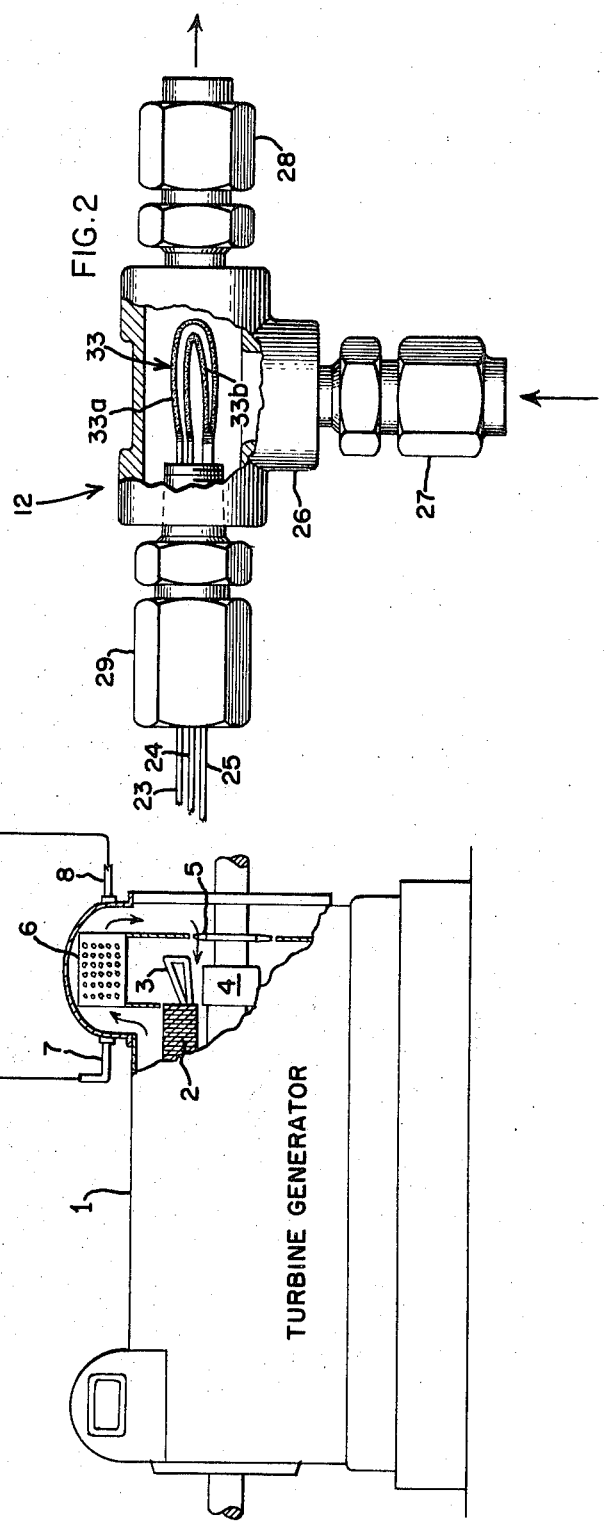

SYSTEM FOR CHECKING THE PERFORMANCE OF A DYNAMOELECTRIC MACHINE OVERHEATING DETECTOR

BACKGROUND OF THE INVENTION

This invention relates generally to a system for checking the performance of an overheating detector for a gas-cooled dynamoelectric machine. More particularly, the invention is an improvement over the generator overheating detector system disclosed in U.S. Pat. No. 3,427,880, issued to L. P. Grobel et al on Feb. 18, 1969, and assigned to the present assignee.

The background and need for a system to detect overheating in the electromagnetic core and other parts of large electrical equipment are set forth in the aforementioned Grobel patent, which is incorporated herein by reference. That patent makes use of the coatings normally applied on generator internal parts and/or provides for placing on the generator internal parts a coating of material selected to produce sub-micron particles at lower temperatures than normal coatings upon overheating. Pipes are connected to withdraw a portion of the cooling gas circulating over the generator parts, and a detector monitors the withdrawn portion of the cooling gas to sense the presence of sub-micron particles.

Since a false signal occasioned by operating failure of the detector may result in unnecessarily shutting down the generator, it would be desirable to have a system for checking the performance of the detector on a periodic basis without taking it out of service. Also, since there may be a filter associated with the detector for obtaining a "zero level" reading, and validating a signal by filtering out the particles and noting whether the signal is thereby erased, it would also be desirable to have a means for checking the filter circuit to see if it is capable of carrying out its intended function.

Accordingly, one object of the present invention is to provide an improved overheating detection system with means for checking the performance of the system without removing it from service.

Another object is to provide an improved overheating detection system with increased reliability.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a simplified schematic diagram of the overheating detection system incorporating the test arrangement of the present invention, and FIG. 2 is an enlarged view, partly in section, illustrating the preferred embodiment of a test device.

SUMMARY OF THE INVENTION

Briefly stated, the invention is practiced by incorporating into the flow path of gas extracted from the dynamoelectric machine and ahead of the detector, a test device with a chamber containing a filament coated with polymeric material selected to produce sub-micron particles when heated. A timed switch connected to a power source allows a momentary current to heat the filament, thereby injecting particles into the detector to simulate overheating and to produce a signal. A filter and bypass circuit may be provided enabling checking the performance of the filter which is associated with the detector.

DESCRIPTION OF THE PREFERRED EMBODIMENT

Referring now to FIG. 1 of the drawing, a dynamoelectric machine, such as a turbine-generator 1 has an internal stator core 2 with windings 3. The rotor 4 includes a fan blade 5 for circulating cooling gas such as hydrogen over the core 2, windings 3, and then through the dome-mounted cooler 6. A portion of the cooling gas is extracted through a conduit 7 on the high-pressure side of fan 5 and returned to the generator through a conduit 8 on the low-pressure side.

The overheating detection system shown generally at 9 is a closed circuit flow path including a flow regulating valve 10, a conventional flow detector 11, a test device 12 which is the subject of the present invention, a three-way valve 13 supplying either a filter 14 or a bypass line 15, and finally a detector 16.

The filter 14 may be of any suitable type commercially available and capable of removing particles of the size of condensation nuclei (sub-micron particles on the order of $10^{-3}$ to $10^{-1}$ microns), a suitable filter being Model No. 95302, Type H, manufactured by the Mine Safety Appliance Company.

The detector 16 may be one of the types described in the aforementioned Grobel et al patent. Preferably, it is of the ion chamber detector type and a suitable ion chamber detector is described in U.S. Pat. No. 3,573,460 issued to G. F. Skala on Apr. 6, 1971 and assigned to the present assignee, the aforesaid Skala patent being incorporated herein by reference.

Presence of sub-micron particles in the gas, produces a signal, which is amplified by an amplifier 17 and a permanent record is provided by a strip recorder 18.

Referring now to the details of test device 12 which is the subject of the present invention, device 12 includes a coated filament 33 in a chamber exposed to the hydrogen cooling gas extracted through conduits 7. A power supply for filament 33 includes a step-down transformer 19, a timed switch 20 and a series resistor 21 having an indicating light 22 connected in parallel therewith. In the preferred embodiment as will be explained in detail later, filament 33 actually includes two filament members energized by leads 23 or 24 with a common lead 25.

Referring now to FIG. 2 of the drawing, the test device may comprise a simple tee fitting 26 with one branch connected to an inlet pipe fitting 27 from flow detector 11 and an outlet pipe fitting 28 connected to the three-way valve 13. The filament 33 is disposed in the gas space inside tee fitting 26 and is brought in by means of a pressure seal or gland fitting 29, a suitable fitting being a Conax power lead pressure seal, Catalog No. PL-18-3.

The two filament members 33a, 33b are connected in common to one inside terminal forming an extension of common lead 25. Filament members 33a, 33b may be of any suitable resistance heating material and in the preferred embodiment are preferably of Nichrome.

Filament members 33a, 33b are coated with a polymeric material designed to produce suitable sub-micron particles when a heating current is passed through the filaments. Although any of the materials mentioned in the aforecited Grobel et al patent would be suitable, it is desirable to use a material of relatively low thermal stability compared to materials being used in the dynamoelectric machine itself. We have found that a coating of polyalphamethylstyrene is satisfactory and provides for several tests of the detector before the coating material is exhausted. Due to the simplicity of construction, however, removal of the gland fitting 29 with the attached filament is very easy. The filaments can be recoated. Also, spare fittings with coated filaments are very inexpensive and easy to replace.

Depending upon the coating selected, the timing of switch 20 is also selected to give a satisfactory test while conserving the coating material. A manually actuated momentary switch could also be used. The time during which current is passed through the filament 33 should only be sufficient to heat it to the temperature for initiating decomposition of the polymeric coating, since continued heating or overheating will only exhaust the coating unnecessarily and require more frequent replacement. We have found that with a Nichrome filament coated with polyalphamethylstyrene and connected to a 6 volt supply, the time is on the order of 10 seconds.

OPERATION OF THE INVENTION

In operation, the three-way valve 13 is positioned as shown and a continuous flow of gas extracted from the dynamoelectric machine passes through the detection system 9. When a signal is received from the ion chamber detector 16, indicating that overheating is taking place, normally this signal is validated by changing the position of three-way valve 13 so as to filter suspected particles from the flow path, and thereby returning the reading on the detector to the normal background level. If filtration does not return the reading to the background level that is normal, then it is concluded that there is a malfunction in the detector and that a false signal was received. It is therefore desirable to be able to determine that the filter is capable of performing its function.

Periodically, the performance of the ion chamber detector 16 is checked by actuating timed switch 20 which causes a heating current to pass through either of the selected filament members 33a, 33b. The polymeric coating is heated and sub-micron decomposition particles are injected into the flow stream at outlet conduit 28. These pass through bypass conduit 15 into the ion chamber detector and produce a signal which simulates overheating in a generator.

In order to check the performance of filter 14, the three-way valve 13 is changed to direct gas through the filter and the timed switch 20 is again actuated. This produces sub-micron particles as before, but no signal should be provided by the detector 16, since the particles should be filtered out.

Thus, by providing a system to check the performance of the operating elements of the detection system without removing them from service, the reliability of the overall system has been increased.

Placing the test device in the detector flow circuit also serves to check the extracted gas flow, although other arrangements are possible. For example, a superseded technique employed a chamber in a separate flow path, external to the dynamoelectric machine and connected from a high-pressure to a low-pressure gas connection, being located as close as possible to the latter. A suitably coated metal strip was placed in the chamber, overheated, and the detector was checked by sampling the gas in the generator. By suitable valving, a desired fraction of the flow of gas taken from the dynamoelectric machine could be sent over the strip while the rest of the flow of gas bypassed the chamber.

However, the preferred embodiment placing the test device in the detector flow circuit was found to be much more convenient and advantageous. External means of heating such as heating tapes, and others may be employed to heat the polymeric coating.

While there has been disclosed what is considered at present to be the preferred embodiment of the invention, other modifications will occur to those skilled in the art and it is intended to cover in the appended claims all such modifications as fall within the true spirit and scope of the invention.

What is claimed is:

1. In an overheating detection system for monitoring a dynamoelectric machine having parts coated with polymeric material and means for passing a cooling fluid over said parts, said detection system including conduit means extracting a flow of said fluid and a detector for sensing presence of sub-micron particles in said extracted fluid, the improvement comprising:
   a test device including filament means coated with polymeric material disposed in said conduit means upstream of said detector, and
   a timed power source connected to pass a momentary heating current through said filament means.

2. The combination according to claim 1 further including a branch conduit path for said extracted fluid between said test device and said detector with valve means for diverting fluid through said branch conduit path, and a sub-micron particle filter disposed in the branch conduit path, whereby the filter performance can be checked by actuating said test device.

3. The combination according to claim 1, wherein said test device comprises a fitting with a removable pressure-tight gland having leads passing therethrough, and wherein said filament means are connected to said leads, whereby the gland and filament means may be easily removed from said fitting and replaced.

* * * * *